United States Patent [19]
Tung

[11] 3,892,958
[45] July 1, 1975

[54] INVERSE/COMPLEMENTARY FUNCTION PREFIX KEY

[75] Inventor: Chung C. Tung, Santa Clara, Calif.

[73] Assignee: Hewlett-Packard Company, Palo Alto, Calif.

[22] Filed: Jan. 11, 1974

[21] Appl. No.: 432,736

[52] U.S. Cl. ........... 235/156; 340/172.5; 340/165 R
[51] Int. Cl.² ............................................ G06F 3/02
[58] Field of Search ................ 235/156, 145 R, 146; 340/365 R, 365 S, 172.5

[56] References Cited

UNITED STATES PATENTS

| | | | |
|---|---|---|---|
| 3,315,889 | 4/1967 | Thevis | 235/145 R |
| 3,317,019 | 5/1967 | Braune | 235/146 X |
| 3,597,600 | 8/1971 | Herendeen et al. | 235/156 |
| 3,762,637 | 10/1973 | Hernandez | 235/156 |
| 3,778,819 | 11/1973 | Bhagawan et al. | 340/365 S |
| 3,781,820 | 12/1973 | Cochran et al. | 340/172.5 |

*Primary Examiner*—David H. Malzahn
*Attorney, Agent, or Firm*—F. David LaRiviere

[57] ABSTRACT

A hand-held programmable calculator is specified, which has a prefix key for designating the inverse or complement of direct functions having legends on the keyboard thereof, thus expanding the utility of the keys on the keyboard.

9 Claims, 1 Drawing Figure

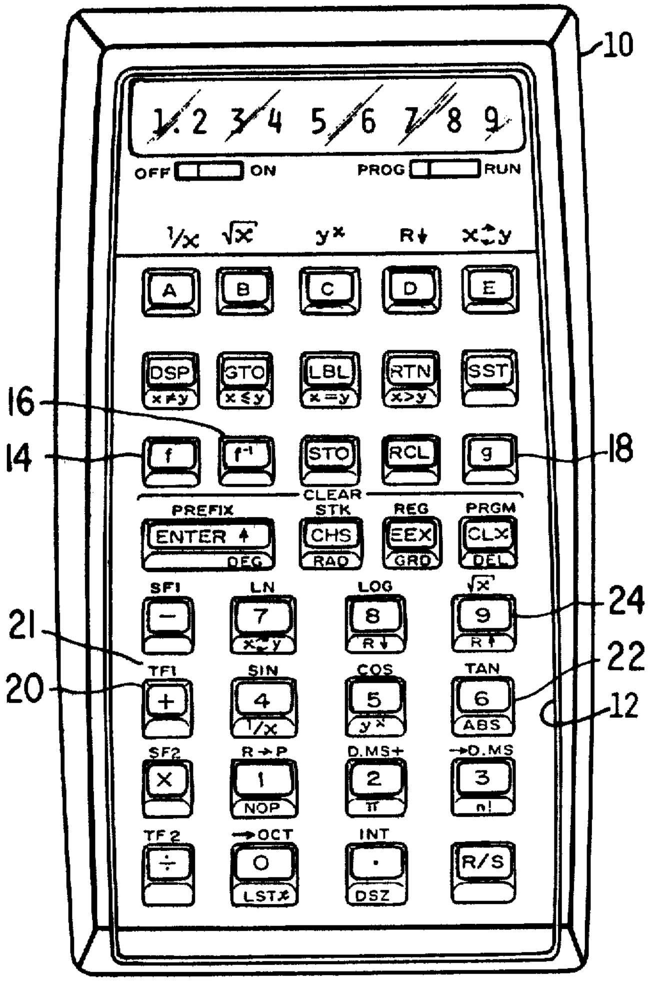

INVERSE/COMPLEMENTARY FUNCTION PREFIX KEY

BACKGROUND AND SUMMARY OF THE INVENTION

A programmable calculator, small enough to hold in one hand, capable of displaying data as it is entered and a numerical result as it is calculated, and incorporating many complex functions in order to perform a large number and many different kinds of scientific calculations and mathematical operations has been the object of much development effort in the past few years. The technology for miniaturizing the necessary circuit components and other elements necessary for such a calculator has been introduced in more recent years. If the keyboard of such a calculator becomes so small and so crowded with keys that the human hand can no longer physically or conveniently manipulate them, further miniaturization is futile. One solution to this problem is to reduce the number of functions the calculator can perform. A better solution is to assign more than one function to each key, and represent more than one function with a single legend, thus reducing the number of keys and the amount of labelling necessary to incorporate all the functional capability of the calculator.

The preferred embodiment of the present invention provides color-coded prefix keys to select one particular function of several which is assigned to one function key. Easily interpreted, color-coded legends are affixed to the keyboard surface immediately above keys to which more than one function is assigned. The legend not only designates two possible functions of the key but also refers the user to the appropriate prefix key for initializing one of those two functions. By actuating one of the appropriate coded prefix keys, the user initializes the function or its inverse or complement, which is executed upon depression of the function key thereafter.

An object of this invention, therefore, is to provide means for activating two or more functions from a single function key contained on the keyboard of a miniature programmable calculator.

DESCRIPTION OF THE DRAWING

The drawing is a top view of a hand-held programmable calculator having a keyboard incorporating a prefix key designed according to the preferred embodiment of the present invention.

DESCRIPTION OF THE PREFERRED EMBODIMENT

The drawing shows the layout of keyboard 12 of miniature programmable calculator 10 which includes a plurality of function and numeric keys. While some of the function keys can perform two functions, several of the function keys and all of the numeric keys are capable of performing more than two functions when used in conjunction with color-coded prefix keys 14, 16 and 18. For example, function key 20 carries one legend "+" which refers to its direct function (no prefix key actuation required). On the keyboard immediately above the key 20, legend 21 indicates a second function "TF1." Legend 21 not only designates the second function "TF1," but is also gold color-coded to refer the user to gold colored prefix key 14 which initializes that function when depressed prior to pressing key 20. The coloration of the body of prefix key 14 corresponds to the coloration of all legends such as legend

21 for association with the functions it initializes. The additional functions initialized by depressing prefix key 14 for which legends are affixed to the keyboard above the various function and numeric keys are given in Table 1 below.

Prefix key 14 has the legend "*f*" affixed to its surface which indicates to the user that, when actuated, it initializes the direct functions labelled by all gold color-coded legends on the keyboard. Prefix key 16, which is also gold colored, has the legend "$f^{-1}$" to indicate that, upon actuation, it initializes the inverse or complement of all functions labelled by gold color-coded legends with the exception of the clear functions "PREFIX," "STK," "REG" and "PRGM." There is no inverse or complement of these functions and either prefix key 14 or 16 initializes them.

Whether actuation of prefix key 16 conditions the machine to perform an inverse or complement of a function is known to the user from a reading of the calculator manual. For example, actuation of numeric key 22 after depressing prefix key 16 activates the $Tan^{-1}$ (arc tangent) function or the inverse of the TAN function. However, when preceded by prefix key 16, numeric key 24 activates the "$X^2$" function or the complement of "$\sqrt{X}$".

Actuation of prefix key 18, which carries the legend "*g*" and blue body coloration, conditions the calculator to perform functions labelled by blue legends on a front face of certain function and numeric keys. The functions prefix key 18 initializes as well as the additional functions initialized by prefix key 16, are also given in Table 1 below.

TABLE I

| Prefix Key Key | Gold-colored with Legend "*f*" | Gold-colored with Legend "$f^{-1}$" | Blue-colored with Legend "*g*" |
|---|---|---|---|
| ENTER | CLEAR PREFIX | CLEAR* PREFIX | DEG |
| CHS | CLEAR STK | CLEAR* STK | RAD |
| EEX | CLEAR REG | CLEAR* REG | GRD |
| CLX | CLEAR PRGM | CLEAR* PRGM | DEL |
| − | SF1 | Reset SF1 | ** |
| + | TF1 | $\overline{TF}1$ | ** |
| ÷ | TF2 | $\overline{TF}2$ | ** |
| 0 | → OCT | ← OCT | LST x |
| 1 | R → P | R ← P | NOP |
| 4 | sin | $\sin^{-1}$ | 1/x |
| 7 | Ln | $e^x$ | x ⇌ y |
| 8 | LOG | $10^x$ | R ↓ |
| 5 | cos | $\cos^{-1}$ | $y^x$ |
| 2 | D.MS+ | D.MS− | π |
| . | Integer Part | Fractional Part | DSZ |
| 3 | → D.MS | ← D.MS | N! |
| 6 | TAN | $TAN^{-1}$ | ABS |
| 9 | $\sqrt{x}$ | $x^2$ | R ↑ |
| DSP | ** | ** | x ≠ y |

TABLE I-Continued

| Prefix Key Key | Gold-colored with Legend "$f$" | Gold-colored with Legend "$f^{-1}$" | Blue-colored with Legend "$g$" |
|---|---|---|---|
| GTO | ** | ** | $x \geqslant y$ |
| LBC | | | $x = y$ |
| RTN | | | $x > y$ |

*no inverse or complement
**no additional function assigned.

Sequential actuation of this key (prefix key 18) and prefix keys 14 and 16 is the same, and similar to that described more fully in U.S. Patent Application entitled "Multifunction Key Designation," Ser. No. 404,941 filed Oct. 10, 1973 by Allan E. Inhelder and Darrel A. Lauer now abandoned. U.S. Patent application Ser. No. 302,371 entitled "General Purpose Calculator with Capability for Performing Interdisciplinary Business Calculations," filed Oct. 30, 1972 by France Rode et al. now U.S. Pat. No. 3,863,060 is incorporated by reference herein.

Color coding of legends to correspond with the color of prefix keys or their legends is a convenient way to expand the utility of keys. Nineteen more calculator functions could be added by incorporating a single "$g^{-1}$" prefix key for designating the inverse or complement of the above listed blue color-coded functions. Such expansion could not otherwise be achieved without adding more keys and confusing legends, which would tend to overcrowd the keyboard, or without sacrificing small size. Further expansion of calculator capability without substantial increase in keyboard size can also be achieved if the keyboard included a first prefix key for the inverse of keyboard initiated functions and a second prefix key for the complement of those functions.

I claim:

1. An input and control keyboard for use in a calculator comprising:

a mounting panel for mounting keys;

a plurality of keys including function and numeric keys, mounted in the mounting panel, for activating input and control functions, each of said keys having more than two functions assigned thereto;

color-coded legends applied to the mounting panel adjacent to the keys for identifying one of the functions assigned thereto;

a first command key mounted in the mounting panel, having a color-coded body coloration for associating that key with functions identified by correspondingly color-coded legends; and a command key legend affixed to the first command key for associating that key with the inverse of functions identified by the correspondingly color-coded legends;

said first command key being manually operable with one of the plurality of keys for designating the inverse of the function identified by the correspondingly color-coded legend assigned to that key.

2. The keyboard of claim 1 further including a second command key having a command key legend and a color-coded body coloration for associating that key with the direct functions identified by the correspondingly color-coded legends wherein said second command key is manually operable with one of the plurality of keys for designating the direct function assigned to that key.

3. The keyboard of claim 1 wherein each legend on the mounting panel identifies more than one of the functions assigned to the adjacent one of the plurality of keys.

4. The keyboard of claim 3 wherein each legend on the mounting panel identifies two functions assigned to the adjacent one of the plurality of keys.

5. The keyboard of claim 1 wherein the first command key is operable with one of the plurality of keys for designating the complement of the function identified by the correspondingly color-coded legend assigned to that key.

6. The keyboard of claim 5 further including a second command key having a command key legend and a color-coded body coloration for associating that key with the direct functions identified by the correspondingly color-coded legends wherein said second command key is manually operable with one of the plurality of keys for designating the direct function assigned to that key.

7. The keyboard of claim 5 wherein the first command key is operable with some of the plurality of keys for designating the inverse of the functions identified by the correspondingly color-coded legends assigned thereto and is operable with some others of the plurality of keys for designating the complement of the functions identified by the correspondingly color-coded legends assigned to the last-mentioned keys.

8. The keyboard of claim 7 wherein the first command key is depressed prior to depressing one of the plurality of keys.

9. The keyboard of claim 7 further including a second command key having a command key legend and a color-coded body coloration for associating that key with the direct functions identified by the correspondingly color-coded legends wherein said second command key is manually operable with one of the plurality of keys for designating the direct function assigned to that key.

* * * * *